US012509561B2

(12) United States Patent
Hanske et al.

(10) Patent No.: US 12,509,561 B2
(45) Date of Patent: Dec. 30, 2025

(54) EPOXY RESIN COMPOSITION FOR USE AS STRUCTURAL ADHESIVE

(71) Applicant: BASF SE, Ludwigshafen Am Rhein (DE)

(72) Inventors: Christoph Martin Hanske, Ludwigshafen am Rhein (DE); Matthaeus Kopczynski, Ludwigshafen am Rhein (DE); Marion da Silva, Ludwigshafen am Rhein (DE); Indre Thiel, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 18/845,040

(22) PCT Filed: Mar. 7, 2023

(86) PCT No.: PCT/EP2023/055674
§ 371 (c)(1),
(2) Date: Sep. 9, 2024

(87) PCT Pub. No.: WO2023/174747
PCT Pub. Date: Sep. 21, 2023

(65) Prior Publication Data
US 2025/0101188 A1    Mar. 27, 2025

(30) Foreign Application Priority Data

Mar. 15, 2022  (EP) .................................. 22162267

(51) Int. Cl.
| | |
|---|---|
| *C09J 163/00* | (2006.01) |
| *B29B 17/04* | (2006.01) |
| *B32B 27/38* | (2006.01) |
| *C08G 59/46* | (2006.01) |
| *C08G 59/50* | (2006.01) |
| *C08J 3/12* | (2006.01) |
| *C08J 3/20* | (2006.01) |
| *C08K 3/36* | (2006.01) |
| *C08K 7/14* | (2006.01) |
| *C08K 9/06* | (2006.01) |
| *C09J 5/00* | (2006.01) |

(52) U.S. Cl.
CPC .............. *C08J 3/203* (2013.01); *C08G 59/46* (2013.01); *C08G 59/5026* (2013.01); *C08G 59/504* (2013.01); *C08J 3/12* (2013.01); *C08K 3/36* (2013.01); *C08K 7/14* (2013.01); *C08K 9/06* (2013.01); *C09J 5/00* (2013.01); *C09J 163/00* (2013.01); *C08G 2170/00* (2013.01); *C08J 2363/02* (2013.01)

(58) Field of Classification Search
None
See application file for complete search history.

(56) References Cited

U.S. PATENT DOCUMENTS 5,281,633 A  *  1/1994  Okuno ................... C08L 67/06
                                                        523/171

FOREIGN PATENT DOCUMENTS

| CN | 110951432 A | | 4/2020 |
|---|---|---|---|
| DE | 265409 A1 | * | 1/1989 |
| EP | 2468792 A1 | | 6/2012 |
| JP | 10314713 A | * | 12/1998 |
| JP | 2005081794 A | * | 3/2005 |
| JP | 2014169407 A | * | 9/2014 |
| JP | 2018104542 A | * | 7/2018 |
| WO | WO-2021/064712 A1 | | 4/2021 |

OTHER PUBLICATIONS

Machine translation of DD-265409-A1 (no date).*
Machine translation of JP-10314713-A (no date).*
Machine translation of JP-2018104542-A (no date).*
Machine translation of JP-2005081794-A (no date).*
Machine translation of JP-2014169407-A (no date).*
"EPIKOTETM Resin MGS® BPR 135G3—Epikuretm Curing Agent MGS® BPH 134G-137G, 137GF", Hexion Technical Information, May 2006, 13 Pages.
Burton, et al., "Chapter 4: JEFFAMINE® PEA as Epoxy Curing Agents", Epoxy Formulations using Jeffamine Polyetheramines, Apr. 27, 2005, pp. 8-11.
European Search Report for EP Patent Application No. 22162267.3, Issued on Sep. 8, 2022, 3 pages.
Gill, et al., "Modulated differential scanning calorimetry", Journal of thermal analysis, vol. 40, Issue 3, Feb. 26, 2014, pp. 931-939.
Henningsen, et al., "Chemie im Rotorblatt Was Windturbinen den richtigen Dreh gibt (Chemistry in the rotor blade What wind turbines the right one rotation)", Chemie in unserer Zeit (Chemistry in our time), vol. 55, Dec. 2021, pp. 406-421.
International Search Report for PCT Patent Application No. PCT/EP2023/055674, Issued on May 30, 2023, 3 pages.

(Continued)

*Primary Examiner* — Michael J Feely
(74) *Attorney, Agent, or Firm* — Grüneberg and Myers PLLC

(57) ABSTRACT

A method prepares a curable composition based on ground composite material from the recycling of discarded composite elements such as old pipes or rotor blades of wind power plants. The ground composite material allows for the replacement of virgin short glass fibers and fumed silica commonly employed in such compositions used as structural adhesives essentially without any negative impact on the performance.

11 Claims, No Drawings

(56) References Cited

OTHER PUBLICATIONS

Written Opinion for PCT Patent Application No. PCT/EP2023/055674, Issued on May 30, 2023, 4 pages.
Matykiewicz, et al., "Morphology and thermomechanical properties of epoxy composites highly filled with waste bulk molding compounds (BMC)", Journal of Polymer Engineering . Apr. 2015, pp. 1-8.
Office Action issued in European Patent Application No. 23708514.7 on Sep. 25, 2025, 5 pages.

* cited by examiner

EPOXY RESIN COMPOSITION FOR USE AS STRUCTURAL ADHESIVE

CROSS-REFERENCE TO RELATED APPLICATIONS

This application is a National Stage entry under § 371 of International Application No. PCT/EP2023/055674, filed on Mar. 7, 2023, and which claims the benefit of priority to European Patent Application No. 22162267.3, filed on Mar. 15, 2022. The content of each of these applications is hereby incorporated by reference in its entirety.

The present invention relates to a method for preparing a curable composition and the epoxy resin component and the hardener component thereof particularly useful for adhesive application characterized in that they comprise ground composite material made from discarded composite elements such as old pipes or rotor blades of wind power plants. The invention also relates to the corresponding curable composition and its components, to the curing of such composition and the corresponding cured epoxy resin, as well as to their use as structural adhesive. In such curable composition, this recycled ground composite material can replace virgin short glass fibers and fumed silica, which are conventionally employed in curable compositions used as structural adhesives, essentially without any negative impact on the performance.

Epoxy resins are common knowledge and on account of their toughness, flexibility, adhesion and chemicals resistance are used as materials for surface coating, as adhesives and for molding and laminating as well as for producing fiber-reinforced composite materials.

Typical curing agents for epoxy resins are polyamines which bring about a polyaddition reaction (chain extension). Polyamines having a high reactivity are generally added to the epoxy resin only shortly before the desired curing. Such systems are therefore so-called two-component (2K) systems. Such two-component systems are widely used for the production of fiber-reinforced composite materials with embedded or impregnated reinforcing fibers, e.g. by the means of infusion or injection methods such as vacuum-assisted resin transfer molding (VAR™) or resin transfer molding (RTM), pultrusion or filament winding methods, or the curing of prepregs, sheet molding compounds (SMC), bulk molding compounds (BMC) or structural adhesives. Commonly used reinforcing fibers are glass fibers.

The use of structural adhesives for the bonding of components, where high mechanical strength is needed, becomes more and more important, e.g. for the assembly of large composites such as large wind turbine blades or structural parts of car bodies.

The structural adhesives for such applications usually comprise large amounts of short glass fibers for lowering the exothermal reaction and for improved mechanical stability and fatigue properties and minimized shrinkage of the bonding (Hexion Technical Information to Adhesive EPIKOTE™ Resin MGS® BPR 135G3, publ. 2006). Additionally, such structural adhesives usually require a thixotropic behavior (Henningsen & Ruckdäschel, "*Chemie im Rotorblatt*", Chemie in unserer Zeit, Vol. 55, p. 406-421; section "Verkleben"). The two components (epoxy resin component and hardener components) as well as the mixed curable composition should be highly viscose pastes which allow for good storage stability without segregation of its parts (e.g.: glass fibers and epoxy resin) and good application even in thick layers and on vertical surfaces. And on the other hand, a lowered viscosity is necessary to allow for efficient mixing of the components and good handling. Such thixotropic behavior is usually realized by the addition of fumed silica to the components which is, however, a comparably expensive additive.

Against this background, therefore, particularly for the use as structural adhesive, there is a search for further epoxy resin based curable compositions where the usually used short glass fibers and eventually also partially the fumed silica are replaced by materials from sustainable sources such as recycled materials which exhibit at least similar mechanical and adhesive performance and with at least similar or improved thixotropic properties compared with the usual structural adhesive.

In the context of this invention, new epoxy resin based curable compositions with ground composite materials have been identified which exhibit at least similar or improved mechanical and adhesive performance and thixotropic properties compared to known epoxy resin based adhesive pastes with virgin short glass fibers instead. The addition of such ground composite material even allows for a reduced addition of expensive fumed silica without impairment of the thixotropic properties.

The present invention accordingly relates to the provision of a method for preparing a curable composition starting from the provision of an epoxy resin component comprising at least one epoxy resin and a hardener component comprising at least one amino curing agent characterized in that the process comprises the steps of (a) providing at least one ground composite material prepared by grinding a composite comprising a polymer matrix and glass fibers, (b) combining and mixing the at least one ground composite material of step (a) with the epoxy resin component or the hardener component or both, (c) combining and mixing of the epoxy resin component and the hardener component resulting from step (b), at least one of which contains the at least one ground composite material, preferably by the means of an asymmetric centrifuge mixer, a planetary mixer, an intensive mixer (e.g. "Eirich-Mixer") or a paste metering system with positive displacement pumps to dispense high-viscosity components.

Also provided is a method for preparing an epoxy resin component which contains at least one ground composite material by combining and mixing at least one ground composite material, which is prepared by grinding a composite comprising a polymer matrix and glass fibers, with an epoxy resin component comprising at least one epoxy resin.

Also provided is a method for preparing a hardener component which contains at least one ground composite material by combining and mixing at least one ground composite material, which is prepared by grinding a composite comprising a polymer matrix and glass fibers, with a hardener component comprising at least one amino curing agent.

The mixing of the at least one ground composite material with the epoxy resin component as well as the mixing of the at least one ground composite material with the hardener component is preferably carried out by the means of an asymmetric centrifuge mixer, a planetary mixer or an intensive mixer (e.g. "Eirich-Mixer").

A further aspect of the invention is a curable composition obtainable or obtained by the method of the invention for preparing a curable composition.

Accordingly, a curable composition is provided comprising
- an epoxy resin component comprising at least one epoxy resin and
- a hardener component comprising at least one amino curing agent, characterized in that
- the epoxy resin component, the hardener component or both components further comprise at least one ground composite material prepared by grinding a composite comprising a polymer matrix and glass fibers.

The invention further relates to an epoxy resin component comprising at least one epoxy resin characterized in that this epoxy resin component further comprises at least one ground composite material prepared by grinding a composite comprising a polymer matrix and glass fibers. Such an epoxy resin component is suitable for the preparation of a curable composition particularly for the use as structural adhesive if combined with a hardener component comprising at least one amino curing agent. Likewise, the invention further relates to a hardener component comprising at least one amino curing agent characterized in that this hardener component further comprise at least one ground composite material prepared by grinding a composite comprising a polymer matrix and glass fibers. Such a hardener component is suitable for the preparation of a curable composition particularly for the use as structural adhesive if combined with an epoxy resin component comprising at least one epoxy resin.

The epoxy resin component according to the invention optionally comprises one or more further constituents, preferably selected from the group consisting of reactive diluents, virgin short glass fibers, other reinforcing fibers, fumed silica and additives. In a particular embodiment, the epoxy resin component according to the invention consists of at least one epoxy resin, optionally one or more ground composite materials and optionally one or more further constituents selected from the group consisting of reactive diluents, virgin short glass fibers, other reinforcing fibers, fumed silica and additives. The hardener component according to the invention optionally comprises one or more further constituents, preferably selected from the group consisting of anhydride curing agents, virgin short glass fibers, other reinforcing fibers, fumed silica and additives, In a particular embodiment, the hardener component according to the invention consists of at least one amino curing agent, optionally one or more ground composite materials and optionally one or more further constituents selected from the group consisting of anhydride curing agents, virgin short glass fibers, other reinforcing fibers, fumed silica and additives. In a particular embodiment, the curable composition according to the invention consists of an epoxy resin component and a hardener component.

Preferably, the polymer matrix of the composite used for producing the at least one ground composite material is a cured epoxy resin or a cured unsaturated polyester resin. Accordingly, in preferred embodiments of the invention the polymer matrix of the at least one ground composite material comprises a cured epoxy resin or a cured unsaturated polyester resin, preferably a cured epoxy resin. More preferably, the cured epoxy resin and cured unsaturated polyester resin account for at least 50% b.w. of the total amount of the polymer matrix, particularly the cured epoxy resin and cured unsaturated polyester resin account for at least 90% b.w. of the total amount of the polymer matrix, more particularly the polymer matrix of the at least one ground composite material consists of cured epoxy resin or cured unsaturated polyester resin or a mixture thereof. In a specific embodiment, the cured epoxy resin accounts for at least 50% b.w. of the total amount of the polymer matrix, particularly the cured epoxy resin accounts for at least 90% b.w. of the total amount of the polymer matrix, more particularly the polymer matrix of the at least one ground composite material consists of cured epoxy resin. Usually, the composite elements used for producing the ground composite material are discarded pipes, silo elements or rotor blades of wind power plants or similar elements. Usually those elements are disassembled, cut up, shredded and optionally granulated before grinding. At this pre-treatment usually the majority of other components such as wood, metals and foams are removed. The grinding can be carried out for example by means of pin mills. For finer ground fractions fine impact mills can be used.

The particle size of the ground composite material can be determined by means of sieving in accordance with the standard DIN 66165 (2016). Preferably the coarse fraction with particle sizes of more than 300 µm as determined by sieving (woven wire sieve with opening size of 300 µm, corresponding to US mesh 50) is removed from the ground composite material used for the components of the curable composition by means of sieving. Preferably, the amount of the very fine fraction of the ground composite material with particle sizes of less than 32 µm as determined by sieving (woven wire sieve with opening size of 32 µm, corresponding to US mesh 450) is less than 40% b.w. most preferably less than 25% b.w. based on the total amount of ground composite material. Accordingly, in a preferred embodiment of the invention the particle size of at least 75% b.w. of the total ground composite material is in the range from 32 to 300 µm as determined by means of sieving using woven wire sieves with the opening sizes of 32 µm and 300 µm, respectively. Preferably, at least 20% b.w. of the total ground composite material have a particle size in the range from 32 to 71 µm as determined by means of sieving using woven wire sieves with the opening sizes of 32 µm and 71 µm, respectively. Such sieves are specified by the standard DIN ISO 3310-1 (2001).

The glass fibers of the at least one ground composite material (employed for the curable composition or the corresponding epoxy resin or hardener component) have a length weighted average fiber length preferably in the range from 0.1 to 1.0 mm, particularly in the range from 0.2 to 0.9 mm, more particularly in the range from 0.4 to 0.7 mm and preferably with a fiber diameter in the range from 5 to 100 µm, particularly in the range from 10 to 20 µm (as average over the total ground composite material employed for the curable composition or the corresponding epoxy resin or hardener component), as determined by optical measurement and image analysis after removal of fiber-bound and free matrix polymer residues by a calcination step of e.g. 2 h at a temperature of 650° C. followed by a slow cooling down to room temperature over a period of e.g. 2 h.

Preferably, the total ground composite material (employed for the curable composition or the corresponding epoxy resin or hardener component) has a content of total inorganic material in the range from 40 to 90% b.w., more preferably from 50 to 80% b.w., particularly from 55 to 75% b.w. The amount of inorganic material is determined by the means of a thermogravimetric analysis according to the standard DIN EN ISO 1172 (1998). The inorganic material is the sum of the glass fibers and any other inorganic material such as inorganic fillers (e.g. calcium carbonate powder) which are part of the ground composite material. Preferably, the composites used for grinding contain less than 20% b.w., more preferably less than 10% b.w., particularly less than 5% b.w., more particularly less than 1% b.w. of such other inorganic material in addition to the amount of glass fibers based on the total amount of inorganic material.

The ground composite material can be used to replace the virgin short glass fiber proportion which is usually included in structural adhesives in whole or in part. In a particular embodiment of the curable composition of the curable composition, the epoxy resin component and the hardener component contain less than 5% b.w., more particular less than 2% b.w., more particular less than 1% b.w. of such virgin glass fibers, in particular are free of such virgin glass fibers.

Preferably, the (total) content of the at least one ground composite material in the curable composition of the invention is in the range from 5 to 35% b.w., more preferably in the range from 15 to 30% b.w. based on the total of the epoxy resin component and the hardener component. Preferably the ground composite material is evenly distributed among the two components of the curable composition in a way that each component (epoxy resin component and hardener component) contains ground composite material in the range from 5 to 35% b.w., preferably in the range from 15 to 30% b.w . . . . In a particular embodiment of the invention, where the ground composite material is used to replace the fraction of the virgin glass fibers only partially, it is preferred that the sum of the ground composite material and the virgin glass fibers in the curable composition of the invention is in the range from 5 to 35% b.w., more preferably in the range from 15 to 30% b.w. based on the total of the epoxy resin component and the hardener component. Preferably the sum of ground composite material and the virgin glass fibers is in the range from 5 to 35% b.w., preferably in the range from 15 to 30% b.w. for each component (epoxy resin component and hardener component).

If virgin glass fibers are employed in the curable composition in addition to the ground composite material, those glass fibers are preferably short fibers, preferably with a maximum length in the range from 0.5 to 5.0 mm, particularly in the range from 0.7 to 1.7 mm, and preferably with a length weighted average fiber length in the range from 0.1 to 1.0 mm particularly in the range from 0.2 to 0.9 mm, more particularly in the range from 0.3 to 0.7 mm. The diameter of such virgin glass fibers is preferably in the range from 5 to 100 µm, particularly in the range from 10 to 20 µm as determined by optical measurement and image analysis. The virgin glass fibers used are typically fibers of E glass, but also those of R glass, S glass and T glass.

Epoxy resin and hardener pastes of structural adhesives usually comprise fumed silica as thixotropic agent. Such fumed silica may be unmodified or modified, e.g. hydrophobically modified. The presence of such fumed silica improves the consistency of the pastes in a way that the viscosity is high enough to avoid segregation of the components of these pastes (e.g. glass fibers or fillers and epoxy resin or curing agent) which allows for an improved storage stability of the pastes. Such increased viscosity is also important for many applications of structural adhesive which have to adhere even if apply on vertical surfaces in thick layers. Simultaneously with such thixotropic fumed silica the viscosity under shear forces is reduced which allows for effective mixing.

In a particular embodiment, the epoxy resin component or the hardener component or both of the invention also comprises fumed silica. Preferably, the content of the fumed silica in the corresponding component is in the range from 3 to 15% b.w., more preferably in the range from 5 to 10% b.w. based on the total of the corresponding component. Preferably the fumed silica is evenly distributed among the two components of the curable composition in a way that each component (epoxy resin component and hardener component) contains fumed silica in the range from 3 to 15% b.w., preferably in the range from 5 to 10% b.w.

Unexpectedly, the ground composite material is not only a good replacement for virgin short glass fibers in structural adhesives, but also exhibit thixotropic properties and therefore can partially replace the addition of fumed silica, particularly if employed in higher amounts. Accordingly, in a particular embodiment, the curable composition of the invention also comprises fumed silica in the range from 2 to 13% b.w. and ground composite material in the range from 8 to 55% b.w., more preferably in the range from 2.5 to 11% b.w. and from 15 to 45% b.w., respectively, particularly in the range from 3.5 to 9% b.w. and from 20 to 40% b.w., respectively, based on the total of the curable composition. Preferably the fumed silica and the ground composite material are evenly distributed among the two components of the curable composition in a way that each component (epoxy resin component and hardener component) contains fumed silica in the range from 2 to 13% b.w. and ground composite material in the range from 8 to 55% b.w., more preferably in the range from 2.5 to 11% b.w. and from 15 to 45% b.w., respectively, particularly in the range from 3.5 to 9% b.w. and from 20 to 40% b.w. based on the total of the corresponding component.

For the use as an adhesive paste, the yield point of the hardener component thereof, is preferably in the range from 500 to 1500 Pa measured at room temperature (25° C.). With a lower yield point, the shelf life is shortened due to easier segregation of the components of the pastes, and with higher yield point the workability of the pastes (mixing, portioning and application) deteriorates.

For the use as an adhesive paste, the maximum viscosity of the hardener component thereof, is preferably in the range from 0.5 to 3.5 MPa*s measured at room temperature (25° C.). With a lower maximum viscosity, the shelf life is shortened due to easier segregation of the components of the pastes, and with higher maximum viscosity the workability of the pastes (mixing, portioning and application) deteriorates.

For the use as an adhesive paste, the viscosity of the epoxy resin component thereof, measured in accordance with DIN ISO 3219 (1993) at a shear-rate of 50 Hz and at room temperature (25° C.), is preferable in the range from 20 to 100 Pas, particularly in the range from 30 to 80 Pa*s. With a lower viscosity, the shelf life is shortened due to easier segregation of the components of the pastes, and with higher-viscosity at a shear rate of 50 Hz the workability of the pastes (mixing, portioning and application) deteriorates.

Epoxy resins according to the present invention typically have 2 to 10, preferably 2 to 6, even more preferably 2 to 4, and especially 2 epoxy groups. The epoxy groups are especially glycidyl ether groups as formed in the reaction of alcohol groups with epichlorohydrin. The epoxy resins may be low molecular weight compounds generally having an average molar weight ($M_n$) of less than 1000 g/mol, or higher molecular weight compounds (polymers). Such polymeric epoxy resins preferably have a degree of oligomerization of 2 to 25, more preferably of 2 to 10, units. Said resins may be aliphatic or cycloaliphatic compounds or compounds having aromatic groups. In particular, the epoxy resins are compounds having two aromatic or aliphatic 6-membered rings or oligomers thereof. Epoxy resins of industrial importance are those obtainable by reaction of epichlorohydrin with compounds having at least two reactive hydrogen atoms, especially with polyols. Of particular importance are epoxy resins obtainable by reaction of epichlorohydrin with compounds comprising at least two, preferably two, hydroxy groups and two aromatic or aliphatic 6-membered rings. Such compounds especially include bisphenol A and bisphenol F, and also hydrogenated bisphenol A and bisphenol F, the corresponding epoxy resins being the diglycidyl ethers of bisphenol A or bisphenol F, or of hydrogenated bisphenol A or bisphenol F. The epoxy resin used according to the present invention is typically bisphenol A diglycidyl ether (DGEBA). Suitable epoxy resins according to the present invention also include tetraglycidylmethylenedianiline (TGMDA) and triglycidylaminophenol or mixtures thereof.

Also suitable are reaction products of epichlorohydrin with other phenols, for example with cresols or phenol-aldehyde adducts, such as phenol-formaldehyde resins, especially novolacs. Epoxy resins not derived from epichlorohydrin are also suitable. Examples of useful resins include epoxy resins comprising epoxy groups via reaction with glycidyl (meth)acrylate. Preference is given in accordance with the invention to using epoxy resins or mixtures thereof that are liquid at room temperature (25° C.). The epoxy equivalent weight (EEW) gives the average mass of the epoxy resin in g per mole of epoxy group.

In a particular embodiment, the epoxy resin component of the invention may additionally comprise reactive diluents. Reactive diluents in the context of the invention are compounds which reduce the viscosity of the epoxy resin component and the corresponding curable composition and which, in the course of the curing of the curable composition, form a chemical bond with the developing network of epoxy resin and curing agent. Preferred reactive diluents in the context of the present invention are low molecular weight organic, preferably aliphatic, compounds comprising one or more epoxy groups.

Reactive diluents of the invention are preferably selected from the group consisting of butane-1,4-diol bisglycidyl ether, hexane-1,6-diol bisglycidyl ether (HDDE), glycidyl neodecanoate, glycidyl versatate, 2-ethylhexyl glycidyl ether, neopentyl glycol diglycidyl ether, p-tert-butyl glycidyl ether, butyl glycidyl ether, C8-C10-alkyl glycidyl ethers, C12-C14-alkyl glycidyl ethers, nonylphenyl glycidyl ether, p-tert-butylphenyl glycidyl ether, phenyl glycidyl ether, o-cresyl glycidyl ether, polyoxypropylene glycol diglycidyl ether, trimethylolpropane triglycidyl ether (TMP), glycerol triglycidyl ether, triglycidylparaaminophenol (TGPAP), divinylbenzyl dioxide and dicyclopentadiene diepoxide. They are more preferably selected from the group consisting of butane-1,4-diol bisglycidyl ether, hexane-1,6-diol bisglycidyl ether (HDDE), 2-ethylhexyl glycidyl ether, C8-C10-alkyl glycidyl ethers, C12-C14-alkyl glycidyl ethers, neopentyl glycol diglycidyl ether, p-tert-butyl glycidyl ether, butyl glycidyl ether, nonylphenyl glycidyl ether, p-tert-butylphenyl glycidyl ether, phenyl glycidyl ether, o-cresyl glycidyl ether, trimethylolpropane triglycidyl ether (TMP), glycerol triglycidyl ether, divinylbenzyl dioxide and dicyclopentadiene diepoxide. They are especially selected from the group consisting of butane-1,4-diol bisglycidyl ether, C8-C10-alkyl monoglycidyl ethers, C12-C14-alkyl monoglycidyl ethers, hexane-1,6-diol bisglycidyl ether (HDDE), neopentyl glycol diglycidyl ether, trimethylolpropane triglycidyl ether (TMP), glycerol triglycidyl ether and dicyclopentadiene diepoxide.

The reactive diluents of the invention preferably account for a proportion up to 30% b.w., more preferably up to 25% b.w., especially from 1% to 20% b.w., based on the amount of epoxy resin.

An amino curing agent in the context of the present invention is understood to mean an amine having an NH functionality of $\geq 2$ (accordingly, for example, a primary monoamine has an NH functionality of 2, a primary diamine has an NH functionality of 4 and an amine having 3 secondary amino groups has an NH functionality of 3).

The amino curing agent employed in the hardener component of the invention may be any aliphatic, cycloaliphatic and aromatic polyamine. Examples of suitable amino curing agent include aliphatic amines, such as diethylenetriamine (DETA), triethylenetetramine (TETA), tetraethylenepentamine (TEPA), 1,12-diaminododecane, 1,10-diaminodecane, 1,5-diaminopentane (cadaverine), propane-1,2-diamine, propane-1,3-diamine;

cycloaliphatic amines, such as dicycan, dimethyldicycan (DMDC), isophoronediamine (IPDA), 1,3-bis(aminomethyl)cyclohexane (1,3-BAC), bis(p-aminocyclohexyl) methane (PACM), 4-methylcyclohexane-1,3-diamine, 2-methylcyclohexane-1,3-diamine, mixtures of 4-methylcyclohexane-1,3-diamine and 2-methylcyclohexane-1,3-diamine (MCDA), 1,2-diaminocyclohexane (DACH), menthenediamine;

aromatic amines, such as methylenedianiline (for example 4,4'-methylenedianiline), diaminodiphenylmethane (DDM), diaminodiphenyl sulfone (DDS), toluene-2,4-diamine, toluene-2,6-diamine, 2,4-diamino-3,5-diethyltoluene, 2,6-diamino-3,5-diethyltoluene (DETDA), 1,2-diaminobenzene, 1,3-diaminobenzene, 1,4-diaminobenzene, diaminodiphenyl oxide, 3,3',5,5'-tetramethyl-4,4'-diaminodiphenyl, 3,3'-dimethyl-4,4'-diaminodiphenyl;

polyetheramines, such as D230 polyetheramine, D400 polyetheramine, D2000 polyetheramine or T403 polyetheramine, 4,9-dioxadodecane-1,12-diamine (DODA), 4,7,10-trioxatridecane-1,13-diamine (TTD);

ether amines, such as 2,2'-Oxydi (ethylamine)

polyaminoamides such as Versamid® 140 or Epilox® H 15-40;

amidoamines; and arylyl amines such as meta-xylylenediamine (MXDA), as well as resinous adducts which are produced by reaction of excess of afore-mentioned amines with epoxy resins, ketimines which are reaction products of afore-mentioned primary amines and ketones, and Mannich base adducts which are reaction products of afore-mentioned amines with formaldehyde and phenol or phenol derivatives.

Preferably the at least one amino curing agent in the context of the present invention is one or more amines selected from the group consisting of polyaminoamids, resinous adducts thereof, polyetheramines, resinous adducts thereof, cycloaliphatic amines, resinous adducts thereof, and Mannich base adducts. The hardener component of the invention may also comprise anhydride curing agents, but preferably comprises no or essentially no anhydride curing agents. An anhydride curing agent in the context of the present invention is understood to mean an intramolecular carboxylic anhydride, for example 4-methyltetrahydrophthalic anhydride.

In the curable composition of the invention, preference is given to using the epoxy compounds (epoxy resins including any reactive diluents having epoxy groups) of the epoxy resin component and amino curing agents of the hardener component in an approximately stoichiometric ratio based on the epoxy groups and the NH functionality. Particularly suitable ratios of epoxy groups to NH functionality are, for example, 1:0.8 to 1:1.2. Alternatively, in a particular embodiment of the invention, the epoxy compounds (epoxy resins including any reactive diluents having epoxy groups) and amino curing agents are used in the epoxy resin composition of the invention in an approximately equivalent ratio, preferably in a ratio in the range from 1:0.8 to 1:1.2 based on the EEW of the epoxy compounds and the AHEW of the amino curing agents.

The curable composition of the invention (in its epoxy resin component and/or its hardener component) may also comprise additional reinforcing fibers such as carbon fibers or virgin long glass fibers in addition to the glass fibers which are part of the ground composite material or additional virgin short glass fibers. In a particular embodiment, the curable composition comprises no such additional reinforcing fibers.

The curable composition of the invention (in its epoxy resin component and/or its hardener component) may also comprise further additives, for example inert diluents, curing accelerators, curing catalysts, pigments, colorants, fillers, release agents, tougheners, flow agents, antifoams, flame retardants or thickeners. Such additives are typically added in functional amounts, i.e., for example, a pigment is typically added in an amount that leads to the desired color for the composition. The compositions of the invention typically comprise from 0% to 50% b.w., preferably from 0% to 20% b.w., for example from 2% to 20% b.w., for the entirety of all additives based on the overall curable composition. In the context of the present invention, additives are understood to mean all additions to the curable composition (or to its epoxy resin component or hardener component) that are neither epoxy compound (epoxy resin or reactive diluent with epoxy group) nor curing agent (amino curing agent and/or anhydride curing agent) nor ground composite material nor fumed silica nor virgin short glass fibers or other reinforcing fiber. In the context of this invention, additives are preferably selected from the group consisting of inert diluents, curing accelerators, curing catalysts, pigments, colorants, fillers, release agents, tougheners, flow agents, antifoams, flame retardants and thickeners.

The invention further provides a method for preparing cured epoxy resin by curing the curable composition of the invention. For this purpose, the curable composition is provided by combining and mixing its components (epoxy resin component and hardener component) and then is cured at a temperature practicable for use. The curing is preferably effected at a temperature of at least 50° C., more preferably of at least 60° C. The curing can be effected at temperatures of less than 120° C., especially at temperatures of less than 100° C., especially within a temperature range from 50 to 120° C., most preferably within a temperature range from 60 to 120° C. The curing can preferably be effected under standard pressure. The production processes for cured materials include wet compression methods such as bulk mold compression and sheet mold compression.

In a particular embodiment the invention provides a method for adhering at least two substrates comprising the steps of
(i) applying the curable composition of the invention to at least one of the substrates, resulting in substrates which are at least partially coated with the curable composition,
(ii) bringing into contact the at least two substates, at least one of which is coated with the curable composition,
(iii) allowing the curing of the curable composition.

Preferred substrates for the method of adhering are from one or more materials selected from the group consisting of metal, glass, concrete and plastic, such as polyethylene, polypropylene, polyurethane, polyester, polyamide or polyepoxide including any composites thereof. Preferably, the curable composition is provided by mixing the epoxy resin component, the hardener component and optionally further components such as additives prior to its application to the at least one substrate by the means of an asymmetric centrifuge mixer, a planetary mixer, an intensive mixer (e.g. "Eirich-Mixer") or a paste metering system with positive displacement pumps to dispense high-viscosity components. Preferably, the curable composition is provided and applied to the at least one substrate at a temperature in the range from −10 to 40° C., particularly at room temperature. Preferably, the curable composition is applied to the at least one substrate in a thickness in the range from 1 to 50 mm, particularly in the range from 3 to 30 mm. Preferably the curing of step (iii) is carried out by exposing the curable composition to a temperature in the range of 50 to 120° C., preferably for a period of 0.5 to 24 h, more preferably 1 to 15 h, particularly 2 to 10 h.

The invention further provides the cured epoxy resin composed of the curable composition of the invention. More particularly, the invention provides cured epoxy resin obtainable or obtained by curing a curable composition of the invention. More particularly, the invention provides cured epoxy resin obtainable or obtained by the method of the invention for preparing cured epoxy resin.

The cured epoxy resin essentially represents the length distribution of the short fibers which has been employed in the underlying curable composition either in form of virgin short fiber material or in form of ground composite material. Accordingly, the glass fibers of the cured epoxy resin of the invention have a length weighted average fiber length preferably in the range from 0.05 to 1.0 mm, particularly in the range from 0.1 to 0.8 mm more particularly in the range from 0.3 to 0.7 mm, and preferably with a fiber diameter in the range from 5 to 100 μm, particularly in the range from 10 to 20 μm, as determined by optical measurement and image analysis after removal of fiber-bound and free matrix polymer residues by a calcination step, e.g. of 2 h at a temperature of 650° C., followed by a slow cooling down to room temperature over a period of e.g. 2 h.

In the curable composition of the invention virgin short glass fibers and fumed silica are replaced by ground composite material made from discarded composite elements such as pipes and rotor blades of wind power plants, essentially without negative impact or with even positive impact of the performance as structural adhesive. Such recycling allows for a sustainable use of such composite elements.

The invention further provides the use of the curable composition of the invention as a structural adhesive.

The particle size of a ground composite material or a virgin short glass fiber material can be determined by sieving according to standard DIN 66165 (2016) using a vibratory sieve shaker (e.g. AS300 from Retsch) equipped with standardized sieves (e.g. woven wire sieves according to the standard DIN ISO 3310-1 (2001) from Retsch) having specific mesh or opening sizes (e.g. a stack consisted of lid, 500 μm sieve, 300 μm sieve, 125 μm sieve, 71 μm sieve, 32 μm sieve and bottom). It should be noted that this method allocates fibers with their strong deviation from the spherical shape to smaller particle sizes although they may be much longer.

The fiber size (distribution of length and diameter) of virgin short glass fibers as well as of the fiber pieces within the ground composite material can be determined by optical measurement and image analysis. For the analysis of the fiber size within a ground composite material or within the cured epoxy resin, the fiber-bound and free matrix polymer residues have to be removed from the fiber pieces first by the means of calcination, preferably at a temperature of 650° C. for a period of 2 h followed by a slow cooling down to room temperature over a period of e.g. 2 h. By cooling down slowly, thermal tensions which may cause fiber breakage are minimized. For determining the fiber length distributions of cured resin samples, pieces of least 4*10*10 mm³ size should be used to avoid underestimation of the relevant upper fiber length limit. Digital images with adequate resolution for a fiber length analysis are obtained either by light microscopy or by high resolutions scans (at least 2400 dpi) obtained with a flatbed scanner The length of each individual fiber can be recorded and categorized either manually with the aid of common image analysis software such as ImageJ or using specialized software for automated fiber length distribution analysis such as FiVer (Süddeutsches Kunststoffzentrum Würzburg). For describing the distribution of the fiber length, the following parameters are suitable: arithmetic average fiber length (Ln), length weighted average fiber length (Lw) and arithmetic and weighted percentile values (dn25, dn50, dn75, dn95 and dw25, dw50, dw75, dw95). The length weighted average fiber length is calculated by dividing the sum of the squared individual fiber lengths by the sum of the individual fiber lengths. In the context of this invention the term maximum length is understood as the dw95 value (the length weighted fiber length for the 95% percentile, meaning that 95% of the total measured fiber weight is contained in fibers shorter than this value). Statistically relevant distributions are obtained when at least 1,000, preferably at least 10,000 fibers, are analyzed per sample.

The viscosity of the epoxy resin component or the hardener component, can be determined according to standard DIN ISO 3219 (1993). The viscosity is measured with the aid of a shear stress-controlled rheometer (e.g. MCR 301 from Anton Paar) with plate-plate arrangement (for example with sandblasted plates having a diameter of 25 mm and a gap width of 1 mm (e.g. PP25-S arrangement from Anton Paar). The measurement temperature and the shear rate have a major influence on the viscosity and are therefore a crucial factor in these measurements. Accordingly, the viscosity must be determined at a particular temperature, for example at room temperature (25° C.), and a particular share rate, for example 50 Hz, in order to be comparable. For best reproducibility the rheological measurements are conducted 24 h after mixing the pastes (epoxy resin component or hardener component).

The maximum viscosity of a hardener component, can be determined by measuring the viscosity with the aid of a shear stress-controlled rheometer (e.g. MCR 301 from Anton Paar) with plate-plate arrangement (e.g. PP25-S arrangement with sandblasted plates with diameter of 25 mm and gap width of 1 mm) at e.g. room temperature (25° C.) as a function of the shear stress in the range of e.g. 1 to 3,000 Pa during a period of e.g. 1,500 sec. The maximum viscosity is defined as average of all measured viscosity values above the value of 100,000 Pa*s.

The yield point is a measure for the stress at which an elastic material under increasing stress ceases to behave elastically. Under conditions of tensile strength, the elongation is no longer proportional to the increase in stress. The yield point of a hardener component, can be determined by measuring the viscosity with the aid of a shear stress-controlled rheometer (e.g. MCR 301 from Anton Paar) with plate-plate arrangement (e.g. PP25-S arrangement with sandblasted plates with diameter of 25 mm and gap width of 1 mm) at e.g. room temperature (25° C.) as a function of the shear stress in the range of e.g. 1 to 3,000 Pa during a period of e.g. 1,500 sec. The yield point is defined as the shear stress at which the viscosity falls below the value of 10,000 Pa*s.

The amine hydrogen equivalent weight (AHEW) can be determined either theoretically or empirically, as described by B. Burton et al (Huntsman, "Epoxy Formulations using Jeffamine Polyetheramines", Apr. 27, 2005, p. 8-11). The theoretically calculated amine hydrogen equivalent weight is defined as the quotient of the molecular weight of the amine divided by the number of available amine hydrogens (for example 2 for every primary amino group plus 1 for every secondary amino group). For IPDA, for example, having a molecular weight of 170.3 g/mol and 2 primary amino groups, i.e. 4 available amine hydrogens, the theoretically calculated amine hydrogen equivalent weight is 170.3/4 g/eq=42.6 g/eq. The determination of the empirical amine hydrogen equivalent weight is based on the assumption that equivalent amounts of epoxy resin and amino curing agent result in a cured epoxy resin characterized by a maximum heat distortion resistance (heat distortion temperature (HDT)) or maximum glass transition temperature ($T_g$). Therefore, in order to ascertain the empirical amine hydrogen equivalent weight, mixtures of a fixed amount of epoxy resin and a varying amount of the amino curing agent are cured as completely as possible, the respective HDT or $T_g$ thereof is determined, and the characteristics thus ascertained are plotted against the ratio of the starting materials. The empirical amine hydrogen equivalent weight is of particular significance in cases where the theoretically calculated amine hydrogen equivalent weight is unobtainable, for example in the case of mixtures of polymeric amines. In the context of this invention, AHEW means the theoretical hydrogen equivalent weight if accessible, and otherwise the empirical amine hydrogen equivalent weight based on the determination of a maximum $T_g$ (measured by means of DSC according to standard ASTM D 3418-15 (2015)).

The adhesive strength of an adhesive paste, such as the curable composition of the invention, on a particular surface material can be determined as follows: The freshly mixed adhesive paste is applied as a layer of defined thickness (e.g. 3 mm) to the test surface (e.g. a plate of a cured epoxy resin material) to fasten a dolly (e.g. aluminum with 20 mm diameter). Subsequently the adhesive paste is allowed to cure (e.g. at 80° C. for 12 h). Thereafter, the adhesive strength is determined by applying an increasing tensile strength with a defined increase rate (e.g. with an increase rate of 0.2 MPa per sec) to measure the adhesive strength for the detachment of the adhered dolly in accordance with standard ISO 4624 (2016). Test runs where the dolly detaches from the cured adhesive are deemed to be invalid and are not counted because such detachment is not related to the adhesive strength between the adhesive paste and the test surface.

The mechanical properties of a test specimen composed of cured epoxy resin material (e.g. tensile modulus of elasticity (E-t), tensile stress at break (σ-B), tensile elongation, flexural modulus of elasticity, flexural strength and flexural elongation) can be determined according to standards ISO 527-2:1996 in combination with ISO 527-1 (2012) and ISO 178 (2006) at room temperature (25° C.).

The glass transition temperature ($T_g$) of cured epoxy resin can be determined using a differential calorimeter (DSC), for example in accordance with standard ASTM D 3418 (2015). This involves heating a very small amount of sample (for example about 10 mg) in an aluminum crucible (for example at 5° C./min) and measuring the heat flow to a reference crucible. The evaluation of the $T_g$ step of the heat-flow curve can be determined via the inflection point, according to the half width or according to the midpoint temperature method.

EXAMPLES

Example 1

Preparation of Ground Composite Material

Ground composite material (samples A, B, C and D) was produced from glass fiber-reinforced composite elements based on cured epoxy resin (EP) or unsaturated polyester resin (UP) as matrix material by means of a pin mill (PM) for a coarser powder or by means of a fine impact mill (FIM). Coarse particles with a particle size of more than 300 µm have been removed by means of sieving (US mesh 50).

Particle size distribution has been determined by means of sieving in accordance with the standard DIN 66165 (2016) by the means of a vibratory sieve shaker (AS300, from Retsch) with the natural resonance frequency of this device determined by the stack setup and loading. The stack consisted of the following sieves (woven wire sieves according to standard ISO 3310-1; from Retsch): lid, 500 µm sieve, 300 µm sieve, 125 µm sieve, 71 µm sieve, 32 µm sieve, bottom. The fractionation was achieved by sieving 100 g of material for 5 min with an amplitude of 1.55 mm. Particle size distribution of the virgin short glass fibers (E-glass, type F2F; from Profill) applied for the comparative examples (GF) has been determined likewise.

The proportion of inorganic material has been determined by means of thermogravimetric analysis according to the standard DIN EN ISO 1172 (1998). These results are summarized in table 1. The starting material used for the grinding was essentially free of other inorganic materials (such as inorganic filler) in addition to the short glass fibers, as proven by electron microscopy of the resulting ground composite material.

Also, the length distributions of the glass fiber pieces contained in these ground composite materials as well as of the virgin short glass fibers were determined by image analysis of high resolution (2,400 dpi) flatbed scanner images. Matrix polymer residues in the samples of the ground composite material were removed before imaging by a calcination of approx. 1 g of the ground composite material for 2 h at a temperature of 650° C. followed by a slow cooling down to room temperature over a period of 2 h. A spatula tip of the calcined fibers was added to a 250 mL bottle filled with water and dispersed by shaking. Before the fibers could settle, an aliquot of the dispersion was transferred into a transparent petri dish placed on a scanner bed. After the bottom of the petri dish had been fully covered with liquid, the fibers were allowed to settle for at least 1 min before a scan of the still wet samples was taken. The virgin short glass fiber material was analyzed likewise. Digital images of the samples were analyzed using the automated algorithm of a fiber length analysis software (FiVer; Süddeutsches Kunststoffzentrum Würzburg) counting at least 10,000 particles per sample. The arithmetic average fiber length (Ln), length weighted average fiber length (Lw), arithmetic percentile values (dn25, dn50, dn75, dn95) and weighted percentile values (dw25, dw50, dw75, dw95) are also summarized in table 1.

TABLE 1

Characteristics of the ground composite materials

| Ground composite material | A | B | C | D | GF |
|---|---|---|---|---|---|
| Matrix polymer | UP | UP | EP | EP | |
| Grinding method | FIM | PM | FIM | PM | |
| Inorganic material (% b.w.) | 64 | 61 | 71 | 71 | |
| Particle size distribution | | | | | |
| <32 µm fraction (% b.w.) | 15.6 | 22.2 | 11.8 | 12.0 | 18.1 |
| 32 to 71 µm fraction (% b.w.) | 64.0 | 28.3 | 41.6 | 33.6 | 81.4 |
| 71 to 125 µm fraction (% b.w.) | 15.0 | 19.5 | 26.5 | 18.9 | 0.5 |
| 125 to 300 µm fraction (% b.w.) | 5.4 | 30.0 | 20.1 | 35.5 | 0.0 |
| Fiber length distribution | | | | | |
| Ln (µm) | 77.0 | 216.4 | 130.0 | 199.4 | 166.2 |
| Lw (µm) | 150.7 | 637.8 | 303.4 | 578.5 | 328.8 |
| dn25 (µm) | 52.9 | 52.9 | 45.8 | 49.4 | 74.1 |
| dn50 (µm) | 63.5 | 84.7 | 74.1 | 88.2 | 116.4 |
| dn75 (µm) | 74.1 | 211.7 | 151.7 | 215.2 | 190.5 |
| dn95 (µm) | 158.7 | 963.1 | 391.6 | 758.4 | 476.2 |
| dw25 (µm) | 52.9 | 169.3 | 95.3 | 169.3 | 127.0 |
| dw50 (µm) | 74.1 | 571.5 | 197.6 | 419.8 | 222.2 |
| dw75 (µm) | 127.0 | 1005.4 | 384.5 | 839.6 | 423.3 |
| dw95 (µm) | 560.9 | 1449.9 | 945.4 | 1629.8 | 931.3 |

Example 2

Preparation and Rheological Analysis of Resin Pastes (Epoxy Resin Component) 69% b.w. of bisphenol A diglycidylether epoxy resin (EEW: 187), 7.7% b.w. of 1,6-hexanediol dicylcidylether reactive diluent (EEW: 150), 7.3% b.w. of fumed silica and 16% b.w. of the ground composite material of Example 1 (A, B, C or D) have been vigorously mixed by means of a dual asymmetric centrifuge mixer (SpeedMixer®, from Hauschild; SM) for 5 min at 2,100 rpm at 20 mbar or a planetary mixer (Labotop, equipped with a dispersion disc and a blade stirrer tool; from PC Laborsystems; LT) for 10 min at 300 rpm (blade stirrer tool) and 3,000 rpm (dispersion disc tool) at 10 mbar.

In further tests the epoxy resin component B has been varied in a way that a higher proportion of the ground composite material has been employed (26.3% b.w.) in order to replace part of the fumed silica which has been reduced to 6.0% b.w. (together with 61.0% b.w. of bisphenol A diglycidylether epoxy resin and 6.7% b.w. of 1,6-hexanediol dicylcidylether reactive diluent; B') or to 5.3% b.w. (together with 61.5% b.w. of bisphenol A diglycidylether epoxy resin and 6.9% b.w. of 1,6-hexanediol dicylcidylether reactive diluent; B"). These tests were mixed accordingly.

For comparison, samples with 16% b.w. of virgin short glass fibers (E-glass, type F2F; from Profill) (GF) instead of the ground composite material or with neither ground composite material nor virgin short glass fibers (under up-scaling of the amounts of the other components) (NF) have been prepared accordingly.

The viscosities ($\eta_R$_50 Hz) of the resulting resin pastes at share rate of 50 Hz were measured at room temperature (25° C.) and according to standard DIN ISO 3219 (1993) with the aid of a shear stress-controlled rheometer (MCR 301 from Anton Paar) with plate-plate arrangement (PP25-S, plate diameter of 25 mm; plate sandblasted; gap width: 1 mm).

Viscosity as a function of the shear rate was measured in a range of 0.0001 to 100 Hz using a logarithmic ramp over a total measurement duration of 19.425 s. The viscosity (NR-50 Hz) at 50 Hz was read out from the linearly interpolated curve. The tests were carried out in at least 5 replicates to calculate the average over all replicates and the SEM. The results are summarized in table 2.

TABLE 2

Viscosity at shear rate of 50 Hz of the resin pastes

| Test | NF | GF | A | B | C | D | B' | B" |
|---|---|---|---|---|---|---|---|---|
| $\eta_{R\text{-}50\,Hz}$ after SM mixing [Pa*s] (+/−SEM) | 39.0 +/− 0.6 | 36.3 +/− 0.5 | 41.2 +/− 0.3 | 45.9 +/− 0.6 | 41.4 +/− 1.2 | 43.7 +/− 1.2 | | |
| $\eta_{R\text{-}50\,Hz}$ after LT mixing [Pa*s] (+/−SEM) | | 51.8 +/− 1.0 | | 65.3 +/− 0.4 | | 69.4 +/− 0.4 | 79.0 +/− 1.1 | 70.1 +/− 2.2 |

All pastes comprising ground composite materials (A, B, C, D, B', B") exhibited significantly higher values for $\eta_R$-50 Hz than pastes comprising virgin glass fibers prepared by the same method (GF). Even for samples in which the content of fumed silica was reduced by 20% (B') or 30% (B") higher values were obtained, allowing the preparation of stable pastes with suitable rheological profiles at lowered cost. All samples exhibited pronounced thixotropy. The pastes comprising ground composite material had viscosities of at least 50 kPa*s in the low shear rate regime below 0.001 Hz, surpassing the correspondingly prepared references samples containing no ground materials or only virgin short glass fibers. The samples comprising ground composite material therefore promise shelf-lives at least on par with the references, while exhibiting comparable shear thinning behavior and equally good workability.

Example 3

Preparation and Rheological Analysis of Hardener Pastes (Hardener Component)

76% b.w. of commercially available amino curing agent mixture comprising a polyaminoamide, a polyetheramine and a cycloaliphatic diamine (with an overall AHEW of 80), 7% b.w. of fumed silica and 17% b.w. of the ground composite material of Example 1 (A, B, C or D) have been vigorously mixed by means of a dual asymmetric centrifuge mixer (SpeedMixer®, from Hauschild; SM) or a planetary mixer (Labotop, from PC Laborsystems; LT) as described for the mixing of the epoxy components in Example 2.

In further tests the hardener component B has been varied in a way that a higher proportion of the ground composite material has been employed (27.9% b.w.) in order to replace part of the fumed silica which has been reduced to 5.7% b.w. (together with 66.4% b.w. of the amino curing agent mixture; B') or to 5.0% b.w. (together with 67.1% b.w. of the amino curing agent mixture; B"). These components were mixed accordingly.

For comparison, samples with 17% b.w. of virgin short glass fibers (E-glass, type F2F; from Profill) (GF) instead of the ground composite material or with neither ground composite material nor virgin short glass fibers (under up-scaling of the amounts of the other components) (NF) have been prepared accordingly.

The yield points (yp) and the maximum viscosities (nmax) of the resulting hardener pastes were measured at room temperature (25° C.) with the aid of a shear stress-controlled rheometer (MCR 301 from Anton Paar) with plate-plate arrangement (PP25-S, plate diameter of 25 mm; plate sandblasted; gap width: 1 mm). The viscosity has been measured as a function of the shear stress from 1 Pa up to 3,000 Pa during a period of e.g. 1,500 sec (corresponding to 2 sec per data point or 2 Pa/s increase to the shear stress). The maximum viscosity is given as average of all measured viscosity values above the value of 100,000 Pats and the yield point is given as the shear stress at which the viscosity falls below the value of 10,000 Pa*s. The tests were carried out in at least 5 replicates to calculate the average over all replicates and the SEM. The results are summarized in table 3.

TABLE 3

Yield point and maximum viscosity of the hardener pastes

| Test | NF | GF | A | B | C | D | B' | B" |
|---|---|---|---|---|---|---|---|---|
| yp after SM mixing [Pa] (+/−SEM) | 820 +/− 30 | 550 +/− 20 | 700 +/− 20 | 540 +/− 30 | 780 +/− 30 | 670 +/− 20 | | |
| $\eta_{max}$ after SM mixing [MPa*s] (+/−SEM) | 0.98 +/− 0.06 | 0.38 +/− 0.03 | 0.53 +/− 0.05 | 0.46 +/− 0.02 | 1.01 +/− 0.04 | 0.59 +/− 0.02 | | |
| yp after LT mixing [Pa] (+/−SEM) | | 710 +/− 30 | | 1070 +/− 40 | | 1190 +/− 20 | 1450 +/− 170 | 870 +/− 60 |
| $\eta_{max}$ after LT mixing [MPa*s] (+/−SEM) | | 0.74 +/− 0.06 | | 1.74 +/− 0.18 | | 2.20 +/− 0.17 | 3.12 +/− 0.93 | 1.01 +/− 0.10 |

Pastes comprising ground composite materials (A, B, C, D, B', B") exhibited comparable or higher values for yp and $\eta_{max}$ than pastes comprising virgin glass fibers prepared by the same methods (GF). When prepared with a Labotop mixer, the samples comprising ground composite materials exhibited significantly higher values for yp and $\eta_{max}$ than the corresponding paste comprising virgin short glass fiber. Even for samples in which the content of fumed silica was reduced by 20% (B') or 30% (B") higher values were obtained, allowing the preparation of stable pastes with suitable rheological profiles at lowered cost. All samples showed thixotropic behavior with pronounced shear thinning. All pastes comprising ground composite material exhibited yield points above 500 Pa, warranting shelf-lives at least on par with the GF reference and good workability.

Example 4

Curing Kinetics

Epoxy resin pastes (B, D and for comparison GF) and hardener pastes (B, D and for comparison GF) were prepared by means of a dual asymmetric centrifuge mixer (SpeedMixer®; from Hauschild) (SM) or of a planetary mixer (Labotop, from PC Laborsystems) (LT) as described in Examples 2 and 3. The corresponding epoxy resin pastes (100 g) and hardener pastes (45 g each) were vigorously mixed by means of dual asymmetric centrifuge mixer (SpeedMixer®; from Hauschild). Samples of the resulting two-component compositions (10 to 20 mg each) were directly weighted out into the sample pans, which were then closed with pierced lids and cured in an oven for varying times (2 h, 4 h, 6 h, 8 h, or 15 h) at 70° C. for the LT-mixed samples or at 80° C. for the SM-mixed samples. To monitor the curing kinetics, the glass transition temperature ($T_g$) was measured immediately after these varying curing times by the means of modulated differential scanning calorimetry (P. S. Gill, et al., Journal of Thermal Analysis (1993), vol. 40, pages 931-939) using the following temperature profile: 10° C.→5 K/min up to 100° C. and with a with a modulation by 1 K every 60 s. Values of $T_g$ were obtained from the reversible heat flow curves. The results are summarized in table 5.

TABLE 4

Curing kinetics - glass transition temperature $T_g$ depending the curing time

| mixing | LT | | | SM | | |
|---|---|---|---|---|---|---|
| curing at | 70° C. | | | 80° C. | | |
| resin component | GF | B | D | GF | B | D |
| hardener component | GF | B | D | GF | B | D |
| Curing time | $T_g$ [° C.] after curing | | | | | |
| 2 h | 52.1 | 41.5 | 43.7 | 66.6 | 68.4 | 66.5 |
| 4 h | 66.4 | 62.9 | 61.9 | 77.7 | 73.8 | 74.1 |
| 6 h | 70.7 | 69.4 | 67.5 | 80.0 | 79.2 | 79.0 |

TABLE 4-continued

Curing kinetics - glass transition temperature $T_g$ depending the curing time

| 8 h | 74.5 | 70.7 | 70.3 | 81.8 | 81.5 | 81.1 |
|---|---|---|---|---|---|---|
| 15 h | 79.5 | 75.8 | 75.5 | 84.3 | 82.2 | 83.4 |

The replacement of virgin glass fiber (GF) by ground composite materials (B, D) causes a minor retardation of the curing speed during the initial curing period. For both kinds of ground composite materials (UP- and EP-based) the glass transition temperatures are comparable to those obtained with virgin glass fibers.

Example 5

Pull-Off Tests with Structural Adhesive

Epoxy resin pastes and hardener pastes were prepared by means of a dual asymmetric centrifuge mixer (SpeedMixer®; from Hauschild) or a planetary mixer (Labotop, from PC Laborsystems) as described in Examples 2 and 3. The corresponding epoxy resin pastes (100 g) and hardener pastes (45 g) were vigorously mixed by means of dual asymmetric centrifuge mixer (SpeedMixer®) accordingly. The resulting two-component adhesive pastes were applied as 3 mm thick layer to a surface (plate of glass fiber reinforced (unidirectional mats) composite made by VAR™ process using amine cured epoxy resin as matrix polymer) to fasten a dolly (aluminum with 20 mm diameter). Adhesive pastes were allowed to cure at 80° C. for 12 h. Adhesive strength was determined by applying an increasing tensile strength (0.2 MPa per see) to measure the adhesive strength for the detachment of the adhered dolly (PosiTest AT; from DeFelsko) in accordance with standard ISO 4624 (2016). Tests where the dolly detached from the cured adhesive were regarded invalid and were not counted. Tests were carried out in at least 3 valid replicates to calculate the average over all replicates and the SEM. The results are summarized in table 5.

TABLE 5

Adhesive strength in pull-off tests

| resin component | GF | A | B | C | D | B" |
|---|---|---|---|---|---|---|
| hardener component | GF | A | B | C | D | B' |
| Adh. Strength [MPa] +/− SEM | 11.7 +/− 0.6 | 10.7 +/− 0.7 | 10.9 +/− 0.5 | 11.3 +/− 0.8 | 10.6 +/− 0.7 | 11.6 +/− 0.9 |

(the components of the B"/B' sample were mixed by the means of a Labotop mixer, whereas the components of the other samples (GF, A, B, C, D) are mixed by the means of a SpeedMixer)

For all samples comparable values of the adhesive strength were obtained. As the employed substrates can be regarded a model system for wind blade halves, the results suggest that virgin short glass fibers can be fully replaced by the employed ground composite materials without negative impact on the adhesive strength.

Example 6

Mechanical Properties of Cured Structural Adhesive

Epoxy resin pastes and hardener pastes were prepared by means of a dual asymmetric centrifuge mixer (Speed-Mixer®; from Hauschild) (SM) or of a planetary mixer (Labotop, from PC Laborsystems) (LT) as described in Examples 2 and 3. The corresponding epoxy resin pastes (100 g) and hardener pastes (45 g each) were vigorously mixed by means of dual asymmetric centrifuge mixer by means of a dual asymmetric centrifuge mixer (Speed-Mixer®; from Hauschild). The resulting two-component compositions were formed to a plate of 4 mm thickness using a hydraulic vacuum press. Compositions were allowed to cure in a vacuum press at 100° C. for 2 h and subsequently at 80° C. for 12 h.

After curing, dog-bone specimen of geometry type 1B according to ISO 527-2 (1996) were produced from the plates using a CNC milling machine. The mechanical properties for the cured resin (tensile modulus of elasticity (E-t) and tensile stress at break ($\sigma$-B) were determined at room temperature according to standard ISO 527-2 (1996). Tests were carried out in at least 4 valid replicates to calculate the average over all replicates and the SEM.

Also, the glass transition temperature ($T_g$) of the cured samples was determined by the means of differential scanning calorimetry according to standard ASTM D 3418 (2015), using the following temperature profile: 0° C.→5 K/min up to 150° C. The results are summarized in table 6.

TABLE 6

Mechanical properties and glass transition temperature of cured samples

| mixing | SM | | | | | LT | | | | |
| --- | --- | --- | --- | --- | --- | --- | --- | --- | --- | --- |
| resin component | GF | A | B | C | D | GF | B' | B" | B' | B" |
| hardener component | GF | A | B | C | D | GF | B' | B" | B" | B' |
| E-t [MPa] +/− SEM | 4458 +/− 123 | 3416 +/− 50 | 3569 +/− 138 | 3642 +/− 90 | 4000 +/− 66 | 4385 +/− 132 | 4686 +/− 38 | 4632 +/− 48 | 4505 +/− 44 | 4733 +/− 80 |
| $\sigma$-B [MPa] +/− SEM | 57.6 +/− 1.3 | 66.1 +/− 0.6 | 70.6 +/− 1.2 | 63.3 +/− 1.1 | 71.5 +/− 2.6 | 70.6 +/− 3.6 | 69.2 +/− 4.3 | 63.6 +/− 5.2 | 70.7 +/− 2.8 | 79.3 +/− 1.5 |
| $T_g$ [° C.] | 80 | 82 | 81 | 81 | 82 | 85 | 87 | 88 | 84 | 86 |

Despite containing at least 29% less glass, the samples containing ground composite materials prepared by Speed-Mixer (SM-A, -B, -C, -D) exhibited only slightly lower values for E-t than the corresponding sample prepared by SpeedMixer with virgin short glass fibers (SM-GF). When the amount of ground composite materials was increased to match the inorganic content to that of the GF samples (LT-B', -B" resin and hardener components), the measured values of E-t were even enhanced in comparison to the formulations containing only virgin short glass fibers. All samples comprising ground composite materials exhibited values for σ-B on par with or higher than those of correspondingly prepared samples based on virgin short glass fibers. The best values were obtained for samples containing the ground composite materials B and D, which exhibited the highest average fiber lengths in optical analysis (see tables 1 and 7).

Example 7

Length Distribution of the Glass Fiber Pieces in Cured Structural Adhesive

Samples of cured structural adhesives with various ground composite materials (A, B, C & D, corresponding to Example 1) were prepared as described in Examples 5. Approximately 1 g material was cut from the cured sample (i.e., plates prepared using a hydraulic vacuum press as described in Example 6) and applied to a calcination of 2 h at 650° C. followed by a slow cooling down to room temperature over a period of 2 h to remove the matrix polymer and free the fibers. The length distribution of the polymer free fibers was determined as described in Example 1. The results are summarized in table 7.

TABLE 7

Glass fiber length distributions in cured epoxy resin samples

|   | A | B | C | D |
|---|---|---|---|---|
| Ln (μm) | 73.8 | 138.3 | 126.8 | 166.9 |
| Lw (μm) | 102.9 | 455.6 | 299.6 | 480.1 |
| Arithm. dn25 (μm) | 52.9 | 52.9 | 52.9 | 52.9 |
| Arithm. dn50 (μm) | 63.5 | 74.1 | 74.1 | 74.1 |
| Arithm. dn75 (μm) | 84.7 | 116.4 | 137.6 | 169.3 |
| Arithm. dn95 (μm) | 148.2 | 560.9 | 381.0 | 624.4 |
| Weight dw25 (μm) | 52.9 | 84.7 | 84.7 | 105.8 |
| Weight dw50 (μm) | 74.1 | 232.8 | 169.3 | 317.5 |
| Weight dw75 (μm) | 105.8 | 772.6 | 381.0 | 709.1 |
| Weight dw95 (μm) | 232.8 | 1301.7 | 1037.2 | 1439.3 |

Processing of the ground composite materials into adhesive pastes followed by curing had little impact on fiber length distributions of the finely ground composite material A and C. For the samples B and D comprising longer fibers on average a slight degradation of the fiber length was observed.

The invention claimed is:

1. A method for adhering at least two substrates, comprising:
   (i) applying a curable composition obtained by
   (a) providing at least one ground composite material prepared by grinding a composite comprising a polymer matrix and glass fibers,
   (b) combining and mixing the at least one ground composite material of (a) with an epoxy resin component or a hardener component comprising at least one amino curing agent or both,
   (c) mixing of the epoxy resin component and the hardener component resulting from (b), at least one of which comprises the at least one ground composite material, wherein a polymer matrix of the at least one ground composite material comprises a cured unsaturated polyester resin, and
   a particle size of at least 75% b.w. of a total ground composite material is in a range of from 32 μm to 300 μm as determined by sieving in accordance with the standard DIN 66165 (2016) using woven wire sieve, to at least one of the substrates, resulting in substrates which are at least partially coated with the curable composition,
   (ii) bringing into contact the at least two substrates at least one of which is coated with the curable composition,
   (iii) allowing the curing of the curable composition.

2. The method for adhering of claim 1, wherein the glass fibers of the at least one ground composite material have a weight average length in a range from 0.3 to 1.0 mm as determined by optical measurement and image analysis after removal of fiber-bound and free matrix polymer residues by a calcination step of 2 h at a temperature of 650° C.

3. The method for adhering of claim 1, wherein an amount of a very fine fraction of the at least one ground composite material with particle sizes of less than 32 μm as determined by sieving in accordance with the standard DIN 66165 (2016) using woven wire sieve with opening size of 32 μm is less than 25% b.w. based on the total amount of ground composite material.

4. The method for adhering of claim 1, wherein a content of total inorganic material of the total ground composite material as determined by a thermogravimetric analysis according to the standard DIN EN ISO 1172 (1998) is in a range from 40 to 90% b.w.

5. The method for adhering of claim 1, wherein a content of the at least one ground composite material in the curable composition is in a range from 5 to 35% b.w., based on the total of the epoxy resin component and the hardener component.

6. The method for adhering of claim 1, wherein the epoxy resin component or the hardener component or both also comprise fumed silica in a range from 2 to 13% b.w. based on the corresponding component and a content of the at least one ground composite material is in a range from 8 to 55% b.w. based on the corresponding component.

7. The method for adhering of claim 1, wherein the at least one amino curing agent is one or more amines selected from the group consisting of polyaminoamids, resinous adducts thereof, polyetheramines, resinous adducts thereof, cycloaliphatic amines, resinous adducts thereof, and Mannich base adducts.

8. The method for adhering of claim 1, wherein the mixing of (b) is carried out by an asymmetric centrifuge mixer, a planetary mixer or an intensive mixer.

9. The method for adhering according to claim 1, wherein said curable composition has a fumed silica content of no more than 13% b.w. and a room temperature viscosity of from 0.5 to 3.5 mPa*s.

10. The method for adhering according to claim 1, wherein said ground composite material does not contain particle sizes of more than 300 μm as determined by sieving.

11. An article, obtained by the method of claim 1.

* * * * *